US010012186B2

(12) United States Patent
Roten et al.

(10) Patent No.: US 10,012,186 B2
(45) Date of Patent: Jul. 3, 2018

(54) RAM AIR POWER VALVE

(71) Applicants: Marvin L. Roten, Fenton, MI (US); Michael J Stempien, Rochester Hills, MI (US); Marian Acsiniuc, Tecumseh (CA); Kenneth J Luchkovitz, Clinton Township, MI (US)

(72) Inventors: Marvin L. Roten, Fenton, MI (US); Michael J Stempien, Rochester Hills, MI (US); Marian Acsiniuc, Tecumseh (CA); Kenneth J Luchkovitz, Clinton Township, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/260,537

(22) Filed: Sep. 9, 2016

(65) Prior Publication Data
US 2018/0073476 A1    Mar. 15, 2018

(51) Int. Cl.
*F02M 35/10* (2006.01)
*F02M 35/02* (2006.01)
*B60K 13/02* (2006.01)

(52) U.S. Cl.
CPC ....... *F02M 35/10209* (2013.01); *B60K 13/02* (2013.01); *F02M 35/0209* (2013.01)

(58) Field of Classification Search
CPC ..... F02M 35/162; F02M 35/161; B60K 13/02
See application file for complete search history.

(56) References Cited

U.S. PATENT DOCUMENTS

| 5,092,285 | A  | 3/1992  | Beaber           |
| 5,195,484 | A  | 3/1993  | Knapp            |
| 5,251,712 | A  | 10/1993 | Hayashi et al.   |
| 5,320,190 | A  | 6/1994  | Naumann et al.   |
| 5,492,093 | A  | 2/1996  | Rygiel           |
| 5,590,624 | A  | 1/1997  | Emond et al.     |
| 5,775,450 | A  | 7/1998  | Porter et al.    |
| 6,314,931 | B1 | 11/2001 | Yasuda et al.    |
| 6,314,949 | B1 | 11/2001 | DeGrazia, Jr. et al. |
| 6,691,665 | B2 | 2/2004  | Gray et al.      |
| 7,004,154 | B2 | 2/2006  | Joyce et al.     |
| 7,004,245 | B2 | 2/2006  | Abdeljawad       |
| 7,398,770 | B2 | 7/2008  | Acuna et al.     |
| 7,493,881 | B2 | 2/2009  | Smith et al.     |

(Continued)

FOREIGN PATENT DOCUMENTS

DE    2621066 A1    11/1977

*Primary Examiner* — Long T Tran
(74) *Attorney, Agent, or Firm* — Ralph E Smith

(57) ABSTRACT

An air intake assembly configured to direct air into a throttle body of an engine of an automotive vehicle includes an air cleaner enclosure, primary and secondary air intake ducts, a ram air power valve and a downstream air intake duct. The air cleaner enclosure unit has an air cleaner inlet and an air cleaner outlet. The primary air intake duct directs air between a primary air inlet and the air cleaner inlet. The secondary air intake duct directs air between a secondary air inlet and the air cleaner inlet. The ram air power valve is disposed in the secondary air intake duct and is configured to move between an open position and a closed position. In the open position, air is permitted to flow through the secondary intake duct. In the closed position air is inhibited from passing through the secondary air intake duct.

19 Claims, 4 Drawing Sheets

(56) References Cited

U.S. PATENT DOCUMENTS

| | | | |
|---|---|---|---|
| 8,181,728 B2 * | 5/2012 | Hartland | B60K 11/08 180/68.1 |
| 8,424,295 B2 * | 4/2013 | Bidner | F01N 3/023 60/295 |
| 2004/0065491 A1 | 4/2004 | Dudley et al. | |
| 2004/0094115 A1 | 5/2004 | Jatzke et al. | |
| 2011/0114050 A1 | 5/2011 | Jung | |
| 2013/0153316 A1 | 6/2013 | Stuckey et al. | |
| 2015/0202955 A1 | 7/2015 | Powell et al. | |
| 2016/0153684 A1 * | 6/2016 | Lemieux | B60H 1/3204 62/87 |
| 2016/0319783 A1 * | 11/2016 | Roten | F02M 35/161 |

* cited by examiner

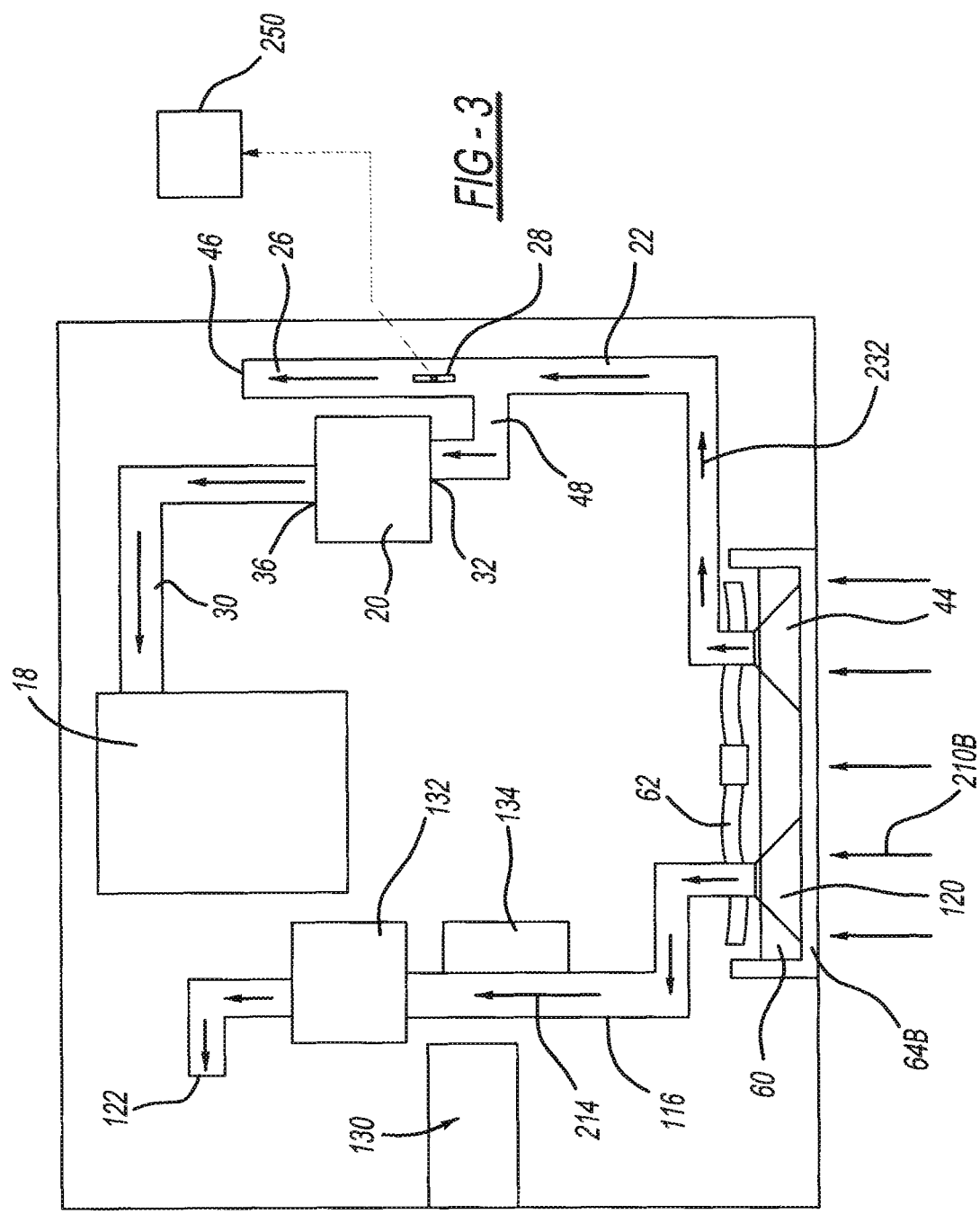

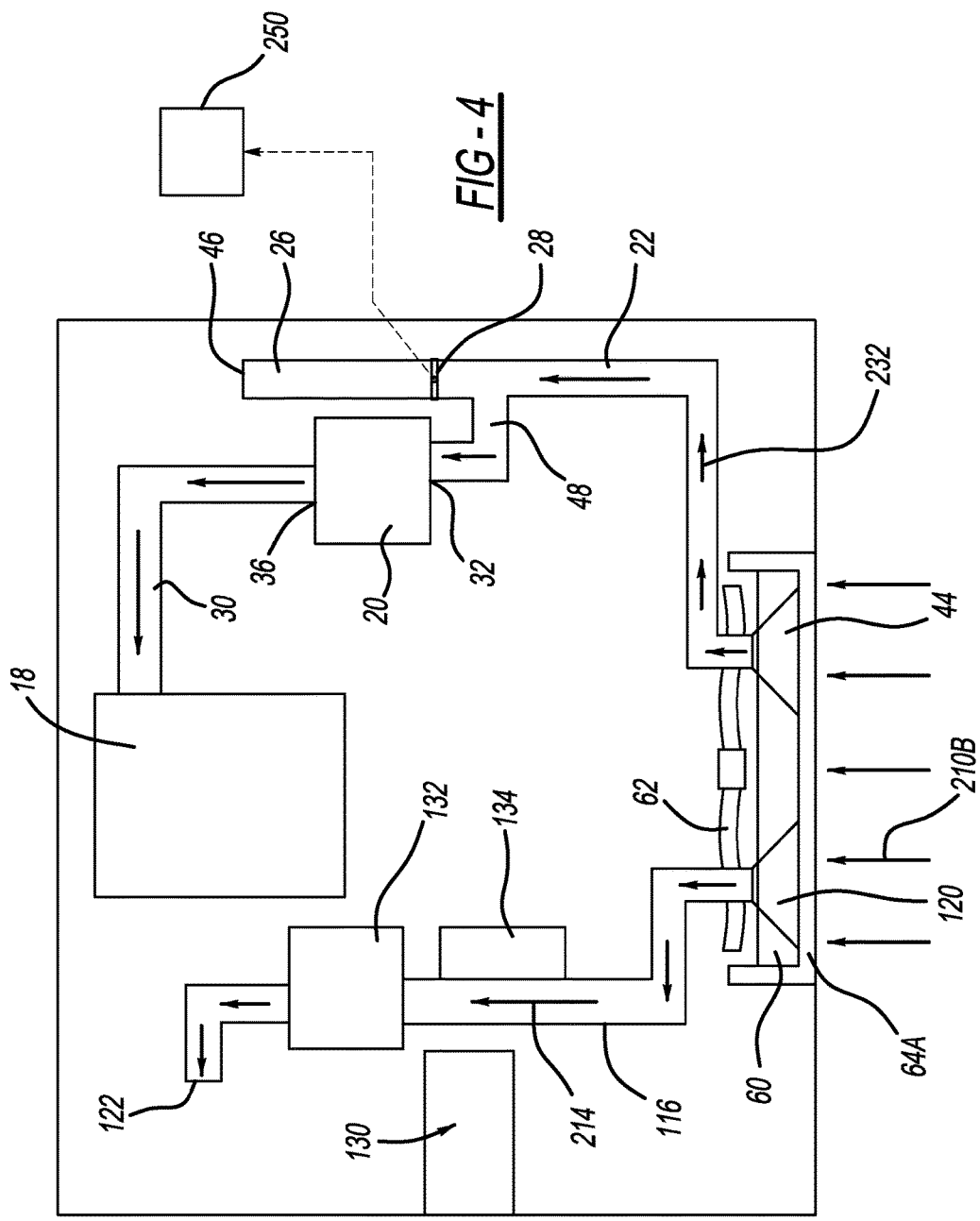

RAM AIR POWER VALVE

FIELD

The present application relates generally to air intake systems of motor vehicles and, more particularly, to an air inlet system of a motor vehicle that incorporates a ram air power valve thereon.

BACKGROUND

Air intake assemblies are provided on automotive motor vehicles to deliver intake air to an intake manifold of an internal combustion engine. The air intake assembly is arranged in an engine compartment of the automotive vehicle. The air intake assembly can include an air cleaner enclosure unit and an air intake duct. In one common arrangement, intake air flows from the air cleaner enclosure unit, through the intake duct and into the intake manifold.

In general, the engine compartment often gets hot in temperature due to the operational temperatures of the various components housed in the engine compartment, including the internal combustion engine and exhaust system. As a result, the intake air is undesirably warmed as it passes through the air cleaner enclosure unit and the air intake duct. As the temperature of the intake air increases, a reduction in engine power and fuel economy occurs. Moreover, in some examples the air intake inlet is located in an area that can take in water. In this regard, if too much water enters the intake duct such that air flow is compromised, the operation of the internal combustion engine can be adversely affected. Thus, while cold air intake systems work for their intended purpose, there remains a need for improvement in the relevant art.

SUMMARY

In one example aspect of the invention, an air intake assembly arranged in an engine compartment of an automotive vehicle is provided. The air intake assembly is configured to direct air into a throttle body of an internal combustion engine of the automotive vehicle. The air intake assembly includes, in one exemplary implementation, an air cleaner enclosure, a primary air intake duct, a secondary air intake duct, a ram air power valve and a downstream air intake duct. The air cleaner enclosure unit has an air cleaner inlet and an air cleaner outlet. The primary air intake duct directs air between a primary air inlet and the air cleaner inlet. The secondary air intake duct directs air between a secondary air inlet and the air cleaner inlet. The ram air power valve is disposed in the secondary air intake duct and is in communication with a controller, the ram air power valve is configured to move between an open position and a closed position. In the open position, air is permitted to flow through the secondary intake duct. In the closed position air is inhibited from passing through the secondary air intake duct. The downstream air intake duct is fluidly connected between and configured to direct air from the air cleaner outlet to the throttle body. The valve is configured to be controlled to move from the open position to the closed position thereby forcing air entering the primary intake duct to be directed into the air cleaner inlet.

In other features, the valve is configured to move from the open position to the closed position upon ram air activating operating conditions being satisfied. The ram air activating operating conditions include a vehicle speed exceeding a speed threshold. In one example, the speed threshold is 40 miles per hour (MPH). The ram air activating operating conditions further include an ambient temperature threshold. In one example, the ambient temperature threshold is 40 degrees Fahrenheit.

In one exemplary implementation, a common intake duct delivers air into the air intake assembly through the air cleaner inlet. The primary air intake duct and the secondary air intake duct converge into the common intake duct. The air intake assembly is configured to alternatively operate between three conditions. In a first condition, inlet air is directed into the air cleaner enclosure unit from the secondary air intake duct and routed concurrently (i) through the air cleaner inlet, through the downstream air intake duct and into the throttle body and (ii) through the primary air intake duct and out of the primary air inlet. In a second condition, inlet air is directed into the air cleaner enclosure unit from the primary air intake duct and routed concurrently (iii) through the air cleaner inlet and into the throttle body and (iv) through the secondary air intake duct and out of the secondary air inlet. In a third condition, inlet air is directed into the air cleaner enclosure unit from the primary intake duct and into the throttle body based on the ram air power valve being closed.

According to additional features, the secondary air inlet is positioned under a hood of the engine compartment. The secondary air intake duct directs air from the secondary air inlet to the air cleaner inlet when the vehicle is stopped. The primary air intake duct directs air from the primary air inlet to the air cleaner inlet when the vehicle is moving. The air pressure is higher at the primary air inlet than the secondary air inlet when the automotive vehicle is in motion.

In one example aspect of the invention, a method of directing intake air into a throttle body of an internal combustion engine of an automotive vehicle is provided. The method includes, in an exemplary implementation, arranging an air cleaner enclosure unit into an engine compartment of the automotive vehicle. The air cleaner enclosure unit has an air cleaner inlet and an air cleaner outlet. A primary air intake duct is routed between a primary air inlet and the air cleaner inlet. A secondary air intake is routed between a secondary air inlet and the air cleaner inlet. The secondary air intake duct has an electronically controlled ram air power valve disposed therein. The ram air power valve is configured to be controlled to move between an open position and a closed position. In the open position, air is permitted to flow through the secondary air intake duct. In the closed position, air is inhibited from flowing through the secondary air intake duct. A downstream air intake duct is routed between the air cleaner outlet and the throttle body. The inlet air is alternatively directed based on three conditions. In the first condition, inlet air is directed into the air cleaner enclosure unit from the secondary air intake duct. The inlet air is routed concurrently (i) through the air cleaner inlet and into the throttle body and (ii) through the primary air intake duct out of the primary air inlet. In the second condition, inlet air is directed into the air cleaner enclosure unit from the primary air intake duct. The inlet air is routed concurrently (iii) through the air cleaner inlet and into the throttle body and (iv) through the secondary air intake duct and out of the secondary air inlet. In the third condition, inlet air is directed into the air cleaner enclosure unit from the primary air intake duct based on the ram air power valve in the closed position.

According to other features, the inlet air is directed into the air cleaner enclosure unit from the secondary air intake duct when the air pressure is higher at the secondary air inlet than the primary air inlet. The air pressure is higher at the secondary air inlet than the primary air inlet when the automotive vehicle is at idle.

In other features, the inlet air is directed into the air cleaner enclosure unit from the primary air intake duct when the air pressure is higher at the primary air inlet than the secondary air inlet. The air pressure is higher at the primary air inlet than the secondary air inlet when the automotive vehicle is in motion. Directing inlet air into the air cleaner enclosure unit from the primary and secondary intake ducts includes directing inlet air into a common intake duct. In the third condition, the ram air power valve is closed based on ram air activating operating conditions being satisfied. The ram air power valve is closed based on ram air activating operating conditions being satisfied including exceeding a speed threshold of 40 miles per hour (MPH). The ram air power valve is closed based on ram air activating operating conditions being satisfied including an ambient temperature exceeding a temperature threshold of 40 degrees Fahrenheit.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a schematic illustration of the air intake assembly of FIG. 1 and shown in an exemplary operating condition where the vehicle is in motion at a speed less than a threshold operating speed and wherein the ram power valve is open; and FIG. 4 is a schematic illustration of the air intake assembly of FIG. 1 and shown in an exemplary operating condition where the vehicle is in motion beyond a threshold operating speed and wherein the ram power valve is closed.

DESCRIPTION

Figure 1:
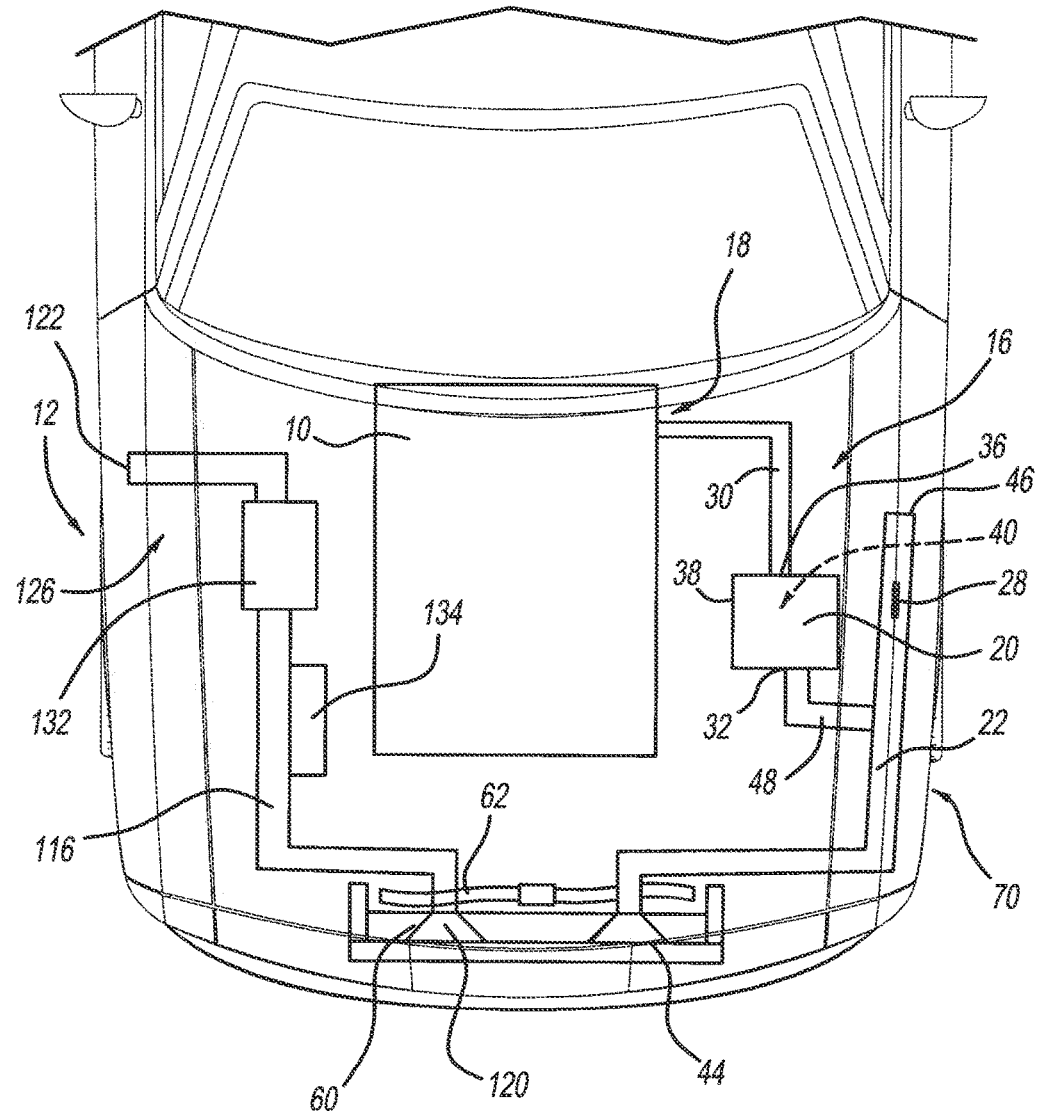
FIG. 1 is a top view of a schematic illustration of an air intake assembly directing air into an internal combustion engine according to one example of the present disclosure.

With initial reference to FIG. 1, an internal combustion engine 10 for powering an automotive vehicle 12 according to one example of the present disclosure is shown. Intake air is directed through an air intake assembly 16 and into a throttle body 18 of the internal combustion engine 10. The air intake assembly 16 includes an air cleaner enclosure unit or air box 20, a primary air intake duct 22, a secondary air intake duct 26, a ram power valve 28 and a downstream air intake duct 30.

The air cleaner enclosure unit 20 further includes an air cleaner inlet 32, and an air cleaner outlet 36. The air cleaner enclosure unit 20 includes a housing 38 that supports an air filter 40. The primary air intake duct 22 directs air between a primary air inlet 44 and the air cleaner inlet 32. The secondary air intake duct 26 directs air between a secondary air inlet 46 and the air cleaner inlet 32. A common intake duct 48 delivers air into the air cleaner enclosure unit 20 through the air cleaner inlet 32 from both of the primary and secondary air intake ducts 22 and 26. Explained differently, the primary air intake duct 22 and the secondary air intake duct 26 converge into the common intake duct 48. The downstream air intake duct 30 is fluidly connected between the air cleaner outlet 36 and the throttle body 18. The downstream air intake duct 30 directs air from the air cleaner outlet 36 into the throttle body 18 of the internal combustion engine 10.

The air intake assembly 16 is arranged in an engine compartment 50 of the automotive vehicle 12. In general, the engine compartment 50 can get hot in temperature from radiative and conducting heat sources. As a result, the intake air provided by the air intake assembly 16 is warmed as it passes through the air cleaner enclosure unit 20 and the air intake duct 22. In addition, air entering the primary air inlet 44 tends to be hot as well. As the temperature of the intake air increases, the loss of engine power also increases. As will become more appreciated from the following discussion, the present disclosure provides an improved air intake assembly that benefits from a dual path air intake that delivers cooler air into the throttle body 18, improving engine performance and fuel economy. The present disclosure further includes the ram air valve 28 that can be moved to a closed position (FIG. 3) to force all intake air from the primary air intake duct 22 into the air cleaner inlet 32. In this regard, no intake air that flows through the primary intake duct 22 is permitted to flow through the secondary air intake duct and out the secondary air inlet 46.

The primary air intake duct 22 will be further described. The primary air intake duct 22 can be arranged to have the primary air inlet 44 proximate to a vehicle radiator 60 and a radiator fan 62. As will become appreciated from the following discussion, in some vehicle driving conditions, a low pressure zone 64A (FIG. 2) exists adjacent to the primary inlet 44 such as when the radiator fan 62 is operating and the vehicle 12 is at idle. In other driving conditions, a high pressure zone 64B (FIG. 3) exists adjacent to the primary inlet 44 such as when the vehicle is moving at speed. The primary air intake duct 22 can be constructed out of a rigid lightweight material such as plastic. It will be appreciated that the primary air intake duct 22 may be routed differently in the engine compartment 50 than shown in the drawings based on a vehicle application.

The secondary air intake duct 26 will be further described. The secondary air intake duct 26 can be configured to have the secondary air inlet 46 arranged at a secondary inlet space 70 (FIG. 1) of the vehicle 12. The secondary inlet space 70 can be generally under the hood of the vehicle 12, at a wheel well of the vehicle or at another generally cooler air source as compared to the engine compartment 50. It will be appreciated that the secondary air intake duct 26 may be routed differently relative to the engine compartment 50 than shown in the drawings based on a vehicle application. It will also be appreciated that the secondary air inlet 46 may be located in other locations around the vehicle 12.

Figure 2:
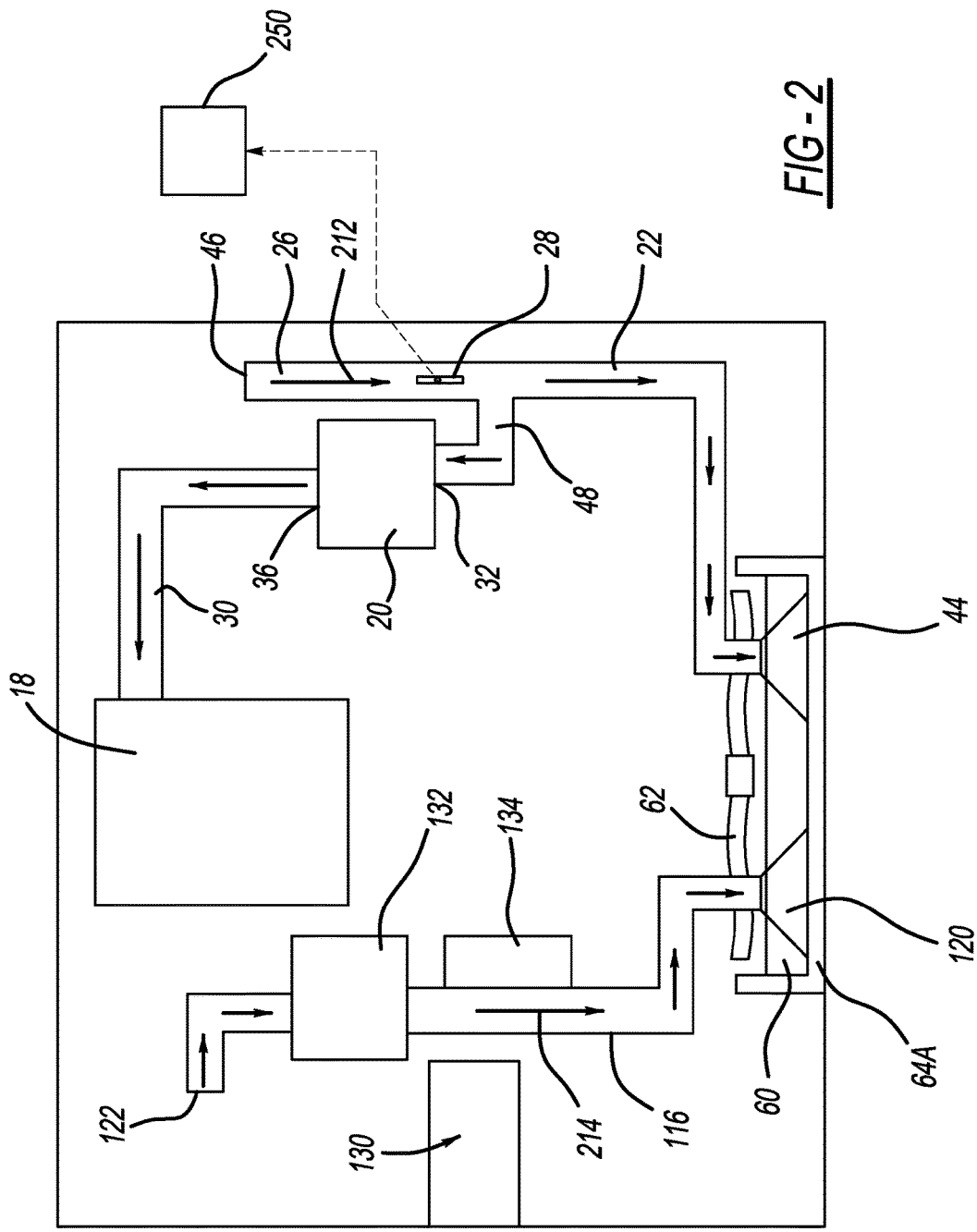
FIG. 2 is a schematic illustration of the air intake assembly of FIG. 1 and shown in an exemplary operating condition where the vehicle is at idle and a ram power valve is in an open position.

With reference again to FIG. 1, additional features of the air intake assembly 16 will be described. An auxiliary air duct 116 includes a first inlet 120 and a second inlet 122. The first inlet 120 is located generally near the radiator 60. The second inlet 122 is located away from the radiator 60 in a generally cooler location 126 within the engine compartment 50. The cooler location 126 can be similar to the secondary inlet space 70 described above. The auxiliary air duct 116 is configured to pass air from the first inlet 120 when the vehicle is in motion (FIG. 3), or from the second inlet 122 when the vehicle is stopped (FIG. 2). The auxiliary air duct 116 cools engine components 130 such as a battery 132 and an electronic control module 134.

With particular reference now to FIG. 2, operation of the air intake assembly 16 according to the present disclosure will now be described. The example shown in FIG. 2 illustrates the vehicle 12 (FIG. 1) operating at idle. At idle, the engine 10 is running at low speed and the vehicle 12 is stopped or slowly moving in a forward direction. When the engine 10 is running and the ambient air is hot, such as during summer driving conditions, the radiator fan 62 operates to draw ambient air 210A toward the radiator 60. As the ambient air 210A is pulled in through the radiator 60 and toward the fan 62, the low pressure zone 64A is created. As a result, inlet air (fresh air supply) 212 is directed into the air cleaner enclosure 20 from the secondary air inlet 46 of the secondary air intake duct 26 and routed concurrently (i) through the air cleaner inlet 32, through the downstream air intake duct 30 and into the throttle body 18; and (ii) through the primary air intake duct 22 out of the primary air inlet 44. In this regard, because a higher pressure exists at the secondary air inlet 46 compared to the primary inlet 44, cool air is drawn into the air intake assembly 16 from the secondary air inlet 46. Concurrently, auxiliary air 214 is drawn through the second inlet 122 of the auxiliary duct 116 to cool the engine components 130 and out of the auxiliary duct 116 through the first inlet 120.

The throttle body 18 will accept an appropriate amount of intake air 212 to run the engine 10 while the remainder will be directed through the primary intake duct 22. Explained differently, the engine 10 will only take the amount of inlet air 212 that it needs through the throttle body 18 while a remainder is diverted back through the primary intake duct 22. By way of example only, for a four cylinder engine, the throttle body 18 may take in only about 6 cubic feet per minute (CFM) while the secondary air intake duct 26 can take in about 20 CFM when the vehicle 12 is at idle. Other values are contemplated. It will be appreciated that the amount of intake air 212 required by the engine 10 at idle is significantly less than the remainder of the intake air exiting through the primary inlet 44 of the primary intake duct 22.

In the example above, the throttle body 18 may only require about one-fourth of the total air entering the secondary air intake duct 26. The remainder of the intake air is used to cool the rest of the air intake assembly 16 including the primary intake duct 22. Notably, the air intake assembly 16 of the present disclosure introduces a significantly higher volume of fresh intake air 212 into the system as compared to a conventional air intake assembly that may only route a volume of air necessary to feed the engine 12. It is also noted that the secondary air intake duct 26 has a cross-sectional area 220A that is greater that a cross-sectional area 220B of the primary intake duct 22 (see FIG. 2).

The volume of intake air 212 provides a significant cooling advantage over conventional systems. In this regard, the air intake assembly 16 uses many multiples of cool fresh air to route through the primary, secondary and auxiliary intake ducts 22, 26 and 116 whereas a conventional system only routes a minimal volume of air dictated by the engine requirements. As explained above, in a conventional system during idle conditions, low volumes of air flowing through a single intake duct along a path through the engine compartment 50 can tend to be very hot ultimately reducing engine performance and fuel economy.

As can be appreciated, while the inlet air 212 is routed through the intake air assembly 16, the whole intake air assembly 16 is cooled. By cooling the air intake assembly 16 as a whole, cooler inlet air can be introduced into the throttle body 18 improving fuel economy and engine performance. Further, the time taken to cool the intake air assembly 16 at idle conditions can establish a relatively cooler air intake assembly 16 when the engine revolutions per minute (RPM) increase or when the vehicle 12 begins to move.

Turning now to FIG. 3, operation of the air intake assembly 16 while the vehicle 12 is in motion according to the present disclosure will now be described. In the example shown in FIG. 3, the vehicle is in motion, however ram air valve activating operating conditions have not been satisfied. When the ram air valve activating operating conditions have not been satisfied, the ram air valve 28 remains in the open position. As used herein, ram air valve activating operating conditions refer to a vehicle speed greater than a threshold vehicle speed and an ambient temperature greater than a threshold ambient temperature. The threshold speed can be any desired speed according to a given application such as at least 40 miles per hour (MPH) for example. The threshold ambient temperature can be any desired temperature according to a given application such as temperatures of at least 40 degrees Fahrenheit.

In the example shown in FIG. 3, the vehicle 10 is moving, however, at least one of the ram air valve activating operating conditions have not been met. In other words, the vehicle 12 is in motion at speeds less than a threshold speed or the ambient temperature is less than the threshold temperature.

When the vehicle 12 is in motion, ambient air 210B is directed into the engine compartment 50 such as through the front grill of the vehicle 12. Some of the ambient air 210B is directed into the primary inlet 44 as inlet air (fresh air supply) 232. It will be appreciated that in this driving condition, the high pressure zone 64B is created (also referred to as "ram air" where intake air is forced into the primary inlet 44).

Inlet air 232 is directed into the air cleaner enclosure 20 from the primary air inlet 44 of the primary air intake duct 22 and routed concurrently (i) as inlet air 232 through the air cleaner inlet 32 and into the throttle body 18 and, (ii) through the secondary air intake duct 26 and out the secondary air inlet 46. In this regard, because a higher pressure exists at the primary inlet 44 as compared to the secondary inlet 46, cool air is drawn into the air intake assembly 16 at the primary inlet 44. Again, the throttle body 18 will accept an appropriate amount of intake air 232 to run the engine 10 while the remainder will be directed through the secondary intake duct 26 and out the secondary air inlet 46. It will be appreciated that the amount of intake air 232 required by the engine 10 while the engine 10 is running at higher RPM than idle is greater than required at idle conditions. The remainder of the intake air exits through the secondary outlet 46 of the secondary intake duct 26.

Similar to the condition described with the vehicle at idle in FIG. 2, the intake air system 16 as a whole is cooled while the vehicle is in motion in FIG. 3. In this regard, while the intake air 232 is routed through the intake air assembly 16, the whole intake air assembly 16 is cooled. By cooling the air intake assembly 16 as a whole, cooler inlet air can be introduced into the throttle body 18 improving fuel economy and engine performance. Likewise, auxiliary air 234 is drawn through the first inlet 120 of the auxiliary duct 116 to cool the engine components 130 and is directed out of the auxiliary duct 116 through the second inlet 122.

Turning now to FIG. 4, operation of the air intake assembly 16 while the vehicle 12 is in motion according to another example of the present disclosure will now be described. In the example shown in FIG. 4, the vehicle 12 is in motion and the ram air valve activating operating conditions have been met. Explained further, the vehicle 12 is moving at speeds greater than the threshold speed and an outside ambient temperature is greater than the threshold temperature. When the ram air valve activating operating conditions have been satisfied, the ram air valve 28 is moved to the closed position. In one example, a controller 250 communicates a signal to the ram air valve 28 to move to the closed position based on satisfying the ram air valve activating operating conditions. It will be appreciated that while the controller 250 is shown, the controller may alternatively be the electronic control module 134. The ram air valve 28 is shown generally as a butterfly style valve however other valve configurations are contemplated within the scope of this disclosure.

In the closed position, intake air 232 is forced through the common intake duct 48 and into the air cleaner enclosure 20. Because the ram air valve 28 is closed, air is inhibited from exiting through the secondary intake duct 26 and out the secondary air inlet 46. Consequently, the air cleaner enclosure 20 and ultimately the throttle body 18 experiences greater pressure resulting in improved engine performance and fuel economy. It will be appreciated that the controller 250 can be configured to move the ram air valve 28 to intermediate positions between open and closed. In this regard, ram air valve activating operating conditions near threshold values may trigger partial closing of the ram air valve 28 based on a given application.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An air intake assembly arranged in an engine compartment of an automotive vehicle and configured for directing air into a throttle body of an engine of the vehicle, the air intake assembly comprising:
   an air cleaner enclosure unit having an air cleaner inlet and an air cleaner outlet;
   a primary air intake duct that directs air between a primary air inlet and the air cleaner inlet;
   a secondary air intake duct that directs air between a secondary air inlet and the air cleaner inlet;
   a ram air power valve disposed in the secondary air intake duct and in communication with a controller, the ram air power valve configured to be controlled to move between (i) an open position wherein air is permitted to flow through the secondary intake duct and (ii) a closed position wherein air is inhibited from passing through the secondary air intake duct; and
   a downstream air intake duct fluidly connected between and configured to direct air from the air cleaner outlet to the throttle body;
   wherein the valve is configured to be controlled to move from the open position to the closed position thereby forcing air entering the primary intake duct to be directed into the air cleaner inlet.

2. The air intake assembly of claim 1, further comprising a common intake duct that delivers air into the air intake assembly through the air cleaner inlet.

3. The air intake assembly of claim 2 wherein the primary air intake duct and the secondary air intake duct converge into the common intake duct.

4. The air intake assembly of claim 1 wherein the air intake assembly is configured to alternatively operate between the following three conditions:
   (A) inlet air is directed into the air cleaner enclosure unit from the secondary air intake duct and routed concurrently (i) through the air cleaner inlet, through the downstream air intake duct and into the throttle body and (ii) through the primary air intake duct out of the primary air inlet based on a higher air pressure at the secondary air inlet compared to the primary air inlet;
   (B) inlet air is directed into the air cleaner enclosure unit from the primary air intake duct and routed concurrently (iii) through the air cleaner inlet and into the throttle body and (iv) through the secondary air intake duct and out of the secondary air inlet based on a higher air pressure at the primary air inlet compared to the secondary air inlet; and
   (C) inlet air is directed into the air cleaner enclosure unit from the primary intake duct and into the throttle body based on the ram air power valve being closed.

5. The air intake assembly of claim 1 wherein the secondary air intake duct directs air from the secondary air inlet to the air cleaner inlet when the vehicle is stopped and wherein the primary air intake duct directs air from the primary air inlet to the air cleaner inlet when the vehicle is moving, wherein an air pressure is higher at the primary air inlet than the secondary air inlet when the automotive vehicle is in motion.

6. The air intake assembly of claim 1 wherein the valve is configured to be controlled to move from the open position to the closed position upon ram air activating operating conditions being satisfied.

7. The air intake assembly of claim 6 wherein ram air activating operating conditions include a vehicle speed exceeding a speed threshold.

8. The air intake assembly of claim 7, wherein the speed threshold is 40 miles per hour (MPH).

9. The air intake assembly of claim 6 wherein the ram air activating operating conditions include an ambient temperature threshold.

10. The air intake assembly of claim 9 wherein the ambient temperature threshold is 40 degrees Fahrenheit.

11. The air intake assembly of claim 1 wherein the secondary air inlet is positioned under a hood of the engine compartment.

12. A method of directing intake air into a throttle body of an engine of an automotive vehicle, the method comprising:
   arranging an air cleaner enclosure unit into an engine compartment of the automotive vehicle, the air cleaner enclosure unit having an air cleaner inlet and an air cleaner outlet;
   routing a primary air intake duct between a primary air inlet and the air cleaner inlet;
   routing a secondary air intake duct between a secondary air inlet and the air cleaner inlet, the secondary air intake duct having an electronically controlled ram air power valve disposed therein and configured to be controlled to move between (i) an open position where air is permitted to flow through the secondary air intake duct and (ii) a closed position where air is inhibited from flowing through the secondary air intake duct;
   routing a downstream air intake duct between the air cleaner outlet and the throttle body; and alternatively directing inlet air between the following three conditions:
- (A) directing inlet air into the air cleaner enclosure unit in a first condition from the secondary air intake duct and routing the inlet air concurrently (i) through the air cleaner inlet and into the throttle body and (ii) through the primary air intake duct out of the primary air inlet based on a higher air pressure at the secondary air inlet compared to the primary air inlet;
- (B) directing inlet air into the air cleaner enclosure unit in a second condition from the primary air intake duct and routing the inlet air concurrently (iii) through the air cleaner inlet and into the throttle body and (iv) through the secondary air intake duct and out of the secondary air inlet based on a higher air pressure at the primary air inlet compared to the secondary air inlet; and
- (C) directing inlet air into the air cleaner enclosure unit in a third condition from the primary air intake duct based on the ram air power valve in the closed position.

13. The method of claim 12 wherein directing inlet air into the air cleaner enclosure unit from the secondary air intake duct includes directing the inlet air into the air cleaner enclosure unit when an air pressure is higher at the secondary air inlet than the primary air inlet.

14. The method of claim 13 wherein the air pressure is higher at the secondary air inlet than the primary air inlet when the automotive vehicle is at idle.

15. The method of claim 14 wherein the air pressure is higher at the primary air inlet than the secondary air inlet when the automotive vehicle is in motion.

16. The method of claim 12 wherein directing inlet air into the air cleaner enclosure unit from the primary and secondary intake ducts both comprise directing inlet air into a common intake duct.

17. The method of claim 12 wherein directing inlet air into the air cleaner enclosure unit in the third condition comprises closing the ram air power valve based on ram air activating operating conditions being satisfied.

18. The method of claim 17 wherein closing the ram air power valve based on ram air activating operating conditions being satisfied comprises a vehicle speed exceeding a speed threshold or an ambient temperature exceeding a temperature threshold.

19. The method of claim 18 wherein the speed threshold is 40 miles per hour (MPH) and the ambient temperature is 40 degrees Fahrenheit.

* * * * *